June 12, 1951          J. FIEDLER          2,556,367
DEVICE FOR CUTTING HARD MATERIALS
Filed Feb. 10, 1948
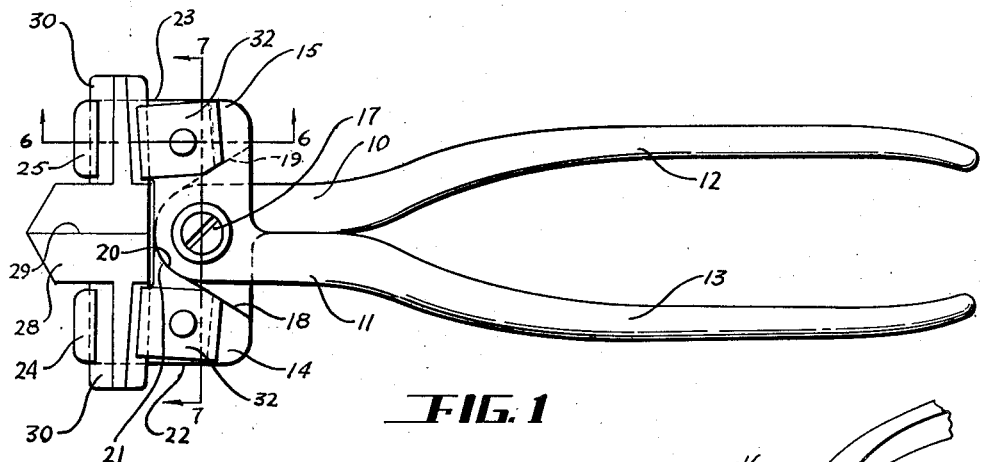
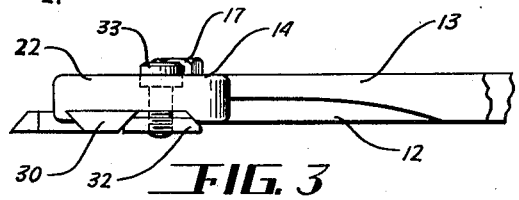
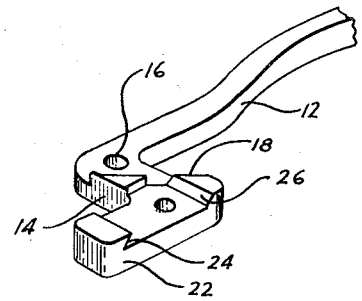
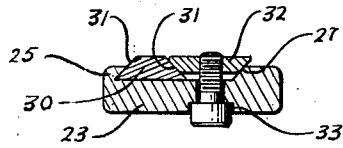
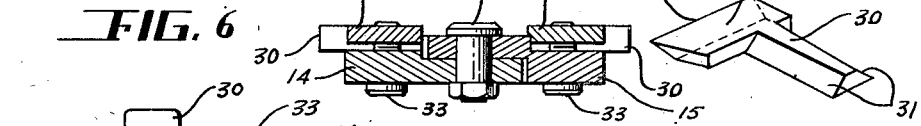
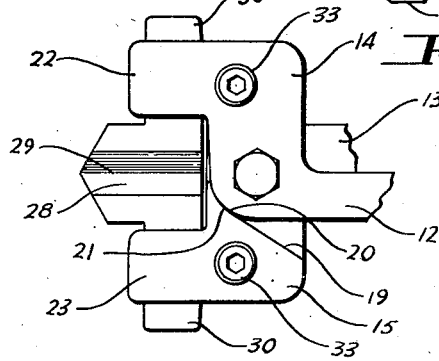
INVENTOR.
JOHN FIEDLER
BY
ATTORNEY Patented June 12, 1951

2,556,367

UNITED STATES PATENT OFFICE 2,556,367

DEVICE FOR CUTTING HARD MATERIALS

John Fiedler, Dayton, Ohio

Application February 10, 1948, Serial No. 7,476

2 Claims. (Cl. 30—349)

This invention relates to a device for cutting hard materials, and is designed more particularly for cutting or trimming articles molded from plastic materials.

One object of the invention is to provide a manually operable cutting device of strong durable construction which has a powerful cutting action and is easily manipulated.

A further object of the invention is to provide such a cutting device with cutting elements which are easily removable for sharpening and replacement.

A further object of the invention is to provide a cutting device of the pliers type in which the pivot pin is relieved of a large portion of the strain to which the device is subjected during the cutting operation.

A further object of the invention is to provide such a cutting device of simple and relatively inexpensive construction.

Other objects of the invention may appear as the device is described in detail.

In the accompanying drawings Fig. 1 is a bottom plan view of a cutting device embodying the invention; Fig. 2 is a top plan view of the same with the handles broken away; Fig. 3 is a side elevation of the device; Fig. 4 is an end view of the device; Fig. 5 is a perspective view of one member of the device; Fig. 6 is a section taken on the line 6—6 of Fig. 1; Fig. 7 is a section taken on the line 7—7 of Fig. 1; Fig. 8 is a perspective view of one of the cutting elements; and Fig. 9 is a perspective view of one of the clamping members.

In these drawings I have illustrated a preferred embodiment of my invention but it is to be understood that the device as a whole, as well as the several parts thereof, may take various forms and may be utilized for cutting materials of various kinds, without departing from the spirit of the invention.

In the particular form here illustrated the invention comprises two members 10 and 11. Each member includes a relatively long rear portion, 12 and 13, and has at one end thereof, and preferably formed integral therewith, a laterally extending portion, 14 and 15. The inner ends of the laterally extending portions are arranged in overlapping engagement and each portion is provided with a bearing opening 16 to receive a pivot pin 17 by which the two members are pivotally connected one with the other. The laterally extending portion of each member is provided with a shoulder, 18 and 19, spaced from the pivotal axis of the two members and preferably inclined, as shown more particularly in Figs. 1 and 2. The shoulder on each member extends across the edge portion of the other member and the inner forward corner of each member is curved about the axis of the pivot pin 17, as shown at 20, to provide a bearing surface which has moving contact with the shoulder of the other member and thus absorbs a large part of the strain imposed on the device during the cutting operation and relieves the pivot pin of a substantial part of that strain. Preferably that portion of each shoulder which contacts the bearing surface 20 of the other member is curved to conform substantially to the curvature of the bearing surface 20, as shown at 21. The rear portions of the shoulders 18 and 19 constitute stops with which the handle portions contact to limit the outward movement thereof.

Cutting elements are connected with the laterally extending portions, 14 and 15, of the two members and are arranged in cooperating relation one to the other to receive the part to be cut between them when they are in their separated positions. Preferably the cutting elements are supported forwardly beyond the pivotal axis of the two members with their cutting edges extending lengthwise of the device and substantially in a line extending through the pivotal axis of the two members when said cutting elements are substantially in contact one with the other. In the present instance the laterally extending portion of each member is provided adjacent its outer end with a forwardly extending part, 22 and 23, on which the cutting element is mounted. Preferably these forwardly extending parts are integral with and form parts of the respective laterally extending portions of the two members. The cutting elements may be of any suitable character and may be mounted on the respective forwardly extending parts of the two members in any suitable manner. In the arrangement here shown each forwardly extending part is provided adjacent its forward end with an undercut shoulder, 24 and 25, and with a beveled shoulder, 26 and 27, spaced laterally from the undercut shoulder. Each cutting element preferably comprises a blade or body portion 28, having a cutting edge 29, and a laterally extending shank 30 the lateral edges of which are beveled as shown at 31. This shank is mounted in the recess formed between the undercut shoulder and the beveled shoulder of the part on which the cutting element is mounted and is of a width substantially less than the width of that recess. A clamping element is arranged between the inner beveled edge of the shank and the beveled shoulder. As here shown this clamping device is in the form of a plate 32 having its lateral edges beveled to conform respectively to the inner beveled edge of the shank 30 and to the inclined surface of the beveled shoulder. Suitable means are provided for drawing this clamping member into tight contact with the shank and the beveled shoulder to force the outer beveled edge of the shank into engagement with the undercut shoulder and to thus rigidly clamp the same to the forwardly extending part on which it is mounted. Preferably a screw 33 extends loosely through an opening in the forwardly extending part and is threaded into the clamping plate so that the rotation of the screw in one direction will draw the plate into very tight contact with the shank of the cutting element and with the beveled shoulder.

The handle portions 12 and 13 of the two members are so arranged that they can be gripped in the hand of the operator and the device manipulated in the manner of a pair of pliers. The handles are of such length as to provide a relatively strong leverage, thus enabling a powerful force to be exerted upon the cutting elements. The contacting bearing surfaces of the two members relieve the pivot pin of a large part of the strain to which it would otherwise be subjected during the cutting operation thereby preventing the distortion of the pivot pin and greatly reducing the wear thereon. The cutting elements are of such a character and are so mounted on the respective members that they can be easily removed for sharpening or for replacement when they are broken or worn beyond repair. Further, the means for connecting the blades with the respective members is such as to permit the blades to be adjusted with relation one to the other to compensate for wear due to repeated sharpenings. The device as a whole is of ample strength to sustain any force which can be manually exerted thereon, and the construction is such that the device can be produced at a relatively low cost.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. A cutting device comprising two members pivotally connected one with the other and each having a handle portion extending rearwardly from the pivotal axis thereof, a portion extending laterally and outwardly therefrom adjacent said pivotal axis and a part rigid with and extending forwardly from the outer end of said laterally extending portion, each of said forwardly extending parts having on one face thereof laterally spaced shoulders, one of which is undercut and the other of which is beveled, cutting elements each including a blade having a cutting edge and a shank extending outwardly from said blade and having beveled edge portions, one edge portion of said shank engaging said undercut shoulder on the corresponding forwardly extending part and the other edge portion of said shank being spaced from the beveled shoulder on said part, a clamping member having beveled edge portions engaging respectively the last mentioned edge portion of said shank and said beveled shoulder, and means for drawing said clamping member into tight engagement with said shank and said beveled shoulder.

2. A cutting device comprising two members each having a handle portion, a portion extending laterally and outwardly from one end of said handle portion and a part extending forwardly from the outer end of said laterally extending portion, means for pivotally connecting said laterally extending portions one with the other adjacent the inner ends thereof, each laterally extending portion having on that face thereof which is adjacent the other member a shoulder adjacent to but spaced from the pivotal axis of said members and each member having a bearing surface in movable contact with the shoulder on the laterally extending portion of the other member, each of said forwardly extending parts having on one face thereof laterally spaced shoulders one of which is undercut and the other of which is beveled, cutting elements supported on each forwardly extending part, having a cutting edge extending lengthwise of said handle portions and including a shank having beveled edge portions, one edge portion of said shank engaging said undercut shoulder on the corresponding member and the other edge portion of said shank being spaced from the beveled shoulder on said member, a clamping member having beveled edge portions engaging respectively the last mentioned edge portion of said shank and said beveled shoulder, and means for drawing said clamping member into tight engagement with said shank and said beveled shoulder.

JOHN FIEDLER

REFERENCES CITED

The following references are of record in the file of this patent:

UNITED STATES PATENTS

| Number | Name | Date |
|--------|------|------|
| 158,205 | Farmer | Dec. 29, 1874 |
| 355,373 | Bowman | Jan. 4, 1837 |
| 456,352 | Boecker | July 21, 1891 |
| 589,809 | Bliss | Sept. 14, 1897 |
| 938,376 | Friday | Oct. 26, 1909 |
| 1,177,302 | Carski | Mar. 28, 1916 |